United States Patent
Hoeing

(10) Patent No.: US 8,427,750 B2
(45) Date of Patent: Apr. 23, 2013

(54) SEMITRANSPARENT MIRROR

(75) Inventor: Thomas Hoeing, Cham (DE)

(73) Assignee: Flabeg Deutschland GmbH, Nuremberg (DE)

( * ) Notice: Subject to any disclaimer, the term of this patent is extended or adjusted under 35 U.S.C. 154(b) by 190 days.

(21) Appl. No.: 12/747,960

(22) PCT Filed: Nov. 19, 2008

(86) PCT No.: PCT/EP2008/009764
§ 371 (c)(1),
(2), (4) Date: Sep. 20, 2010

(87) PCT Pub. No.: WO2009/074209
PCT Pub. Date: Jun. 18, 2009

(65) Prior Publication Data
US 2011/0019284 A1    Jan. 27, 2011

(30) Foreign Application Priority Data
Dec. 12, 2007 (DE) .......................... 10 2007 060 374

(51) Int. Cl.
*G02B 27/14* (2006.01)

(52) U.S. Cl.
USPC ........................................... 359/630

(58) Field of Classification Search .................... 359/630
See application file for complete search history.

(56) References Cited

U.S. PATENT DOCUMENTS

| | | |
|---|---|---|
| 6,312,131 B1 | 11/2001 | Yamamoto et al. |
| 2002/0126265 A1 | 9/2002 | Okura et al. |
| 2005/0007645 A1* | 1/2005 | Tonar et al. .................. 359/265 |

FOREIGN PATENT DOCUMENTS

| | | |
|---|---|---|
| WO | WO 2004/026633 A2 | 4/2004 |
| WO | WO 2007/053710 A2 | 5/2007 |

OTHER PUBLICATIONS

German Standard DIN 5031-3, p. 1-12, Mar. 1982, Berlin, Germany.
German Standard DIN 5033-2, p. 1-8, May 1992, Berlin, Germany.
German Standard DIN 5033-3, p. 1-6, Jul. 1992, Berlin, Germany.
German Standard DIN 5033-7, p. 1-8, Jul. 1983, Berlin, Germany.
German Standard DIN 5036-1, p. 1-8, Jul. 1978, Berlin, Germany.
LINOS—Katalog 2005/2006, S. pp. 102, 103, 160, 166.
International Search Report from PCT/EP2008/009764, mailed on May 15, 2009.

* cited by examiner

*Primary Examiner* — James Jones
(74) *Attorney, Agent, or Firm* — Leydig, Voit & Mayer, Ltd.

(57) ABSTRACT

A semitransparent mirror includes a front side having a front luminous reflectance of at least 60%; a rear side having a rear luminous reflectance of at most 25%; and a light transmittance of at least 20% with a vertical light incidence under standard illuminant C.

19 Claims, 1 Drawing Sheet

SEMITRANSPARENT MIRROR

CROSS REFERENCE TO PRIOR APPLICATIONS

This application is a U.S. National Phase application under 35 U.S.C. §371 of International Application No. PCT/EP2008/009764, filed Nov. 19, 2008, which claims benefit to German Application No. DE 10 2007 060 374.8, filed on Dec. 12, 2007. The International Application was published in German on Jun. 18, 2009 as WO 2009/074209 under PCT Article 21 (2).

The invention relates to a semitransparent mirror, in particular for use as a rear-view mirror in the automobile area, in particular as an inside mirror.

BACKGROUND

Rear-view mirrors in the automobile branch are usually designed and optimized according to a number of current criteria. For typical known automobile mirrors, made, for example, based on coatings made of the highly reflecting metals silver and/or aluminium, one of the essential design and optimization criteria is the achieving of particularly high reflectances. Furthermore, however, in modern concepts for automobile rear-view mirrors, a number of additional criteria are also taken into consideration, which shall guarantee for the driver a particularly high fidelity of reproduction, even under changing environmental or light conditions, as well as the greatest possible freedom of glare or the lowest possible glare when driving at night. The design criteria to be taken into consideration can be, among others, the spectral reflection properties, reproduction of colors, low glare, or the like.

Such aspects are usually used for designing automobile rear-view mirrors which shall exclusively have a mirror function. In this case, in particular a more or less complete reflection of the light stream incident on the mirror—neglecting any possible absorption effects—is required. Especially in modern cockpit or display systems for motor vehicles, one tries, however, to combine mirror elements, in particular the inside mirror, with additional indicating and display functionalities, in addition to the mirror function properly speaking. For this purpose, in particular the mirror element properly speaking shall be supplemented by a display or indicating element arranged—viewed from the viewer—behind the mirror element, so that, in addition to the mirrored picture, additional information can be displayed for the viewer in the same field of view, through a suitable selection of the indicating or display unit. The above-mentioned conventional automobile rearview mirrors are not suited for such a combined setup.

SUMMARY OF THE INVENTION

Therefore, an aspect of the present invention is to provide a semitransparent mirror, in particular for use as motor-vehicle rear-view mirror or motor-vehicle inside mirror, which is well suited for combined use with a subsequent indicating or display element.

In an embodiment of the invention, the semitransparent mirror is formed in such a way that with a vertical light incidence under standard illuminant C, it possesses on its front side a luminous reflectance of minimally 60%, preferably of minimally 65%, and on its rear side, a luminous reflectance of maximally 25%, preferably of maximally 20%, as well as a light transmittance of minimally 20%, preferably of minimally 25%.

The luminous reflectance should be evaluated as the integral reflectance according to the eye sensitivity curve according to CIE 1951. The associated light type according to CIE 1971 to be taken as a basis is the standard illuminant C, i.e. a light spectrum corresponding to a daylight spectrum. The term "front side" designates the side which, with proper use, is facing towards the viewer, or else the light-incidence side, which in case of use as a motor vehicle inside mirror, is facing towards the vehicle inside, whereas the term "rear side" specifies the side which, with proper use, is facing away from the viewer and, in particular in case of combined use with a subsequent indicating or display element, is facing towards the latter.

The invention is based on the idea that, for a suitable combinability with additional indicating or display elements, the mirror should be designed, in the manner of a beam splitter, as a semitransparent mirror, which is specifically adapted to the requirements of use in the field of motor vehicles. On the one hand, the main function of the mirror, namely a relatively high reflection under the usual operating conditions in the motor vehicle, should be maintained to a great extent, and, on the other hand, a suitable transmission for sufficient display illumination should be adjusted. When choosing and specifying the transmittance, one should, furthermore, take into consideration that, although on the one hand a sufficiently effective display illumination is desired, the components located behind the mirror should, on the other hand, be as little noticeable for the driver as possible or even be invisible. Furthermore, for the above-mentioned purpose, the reflection on the rear side should be particularly low, in order to absorb scattered light and thus to improve the contrast of the subsequent display unit.

In view of a favorable adaptation of the mirror properties to typical illumination environments and a suitable fidelity of reproduction and low glare, the semitransparent mirror should be of a suitable design also with regard to its color properties. The color should be as neutral as possible, as far as reflection and transmission are concerned. For this purpose, the semitransparent mirror is preferably designed in such a way that its color values a* (C, 2°) and b* (C, 2°), in each case in reflection on the front side or light-incidence side as well as in transmission with vertical light incidence under standard illuminant C and with a viewer angle of 2° have an absolute amount of maximally 10. To define the color properties, one uses the color coordinates L*, a* and b* in the so-called L*a*b* color space usually used, and specified by the International Illumination Commission (Commission internationale de l'éclairage CIE), for the quantitative and/or qualitative characterization of color properties. The color coordinates characteristic for the rear-view mirror are in the present case measured with vertical light incidence onto the rear-view mirror.

Advantageously, the semitransparent mirror is made from a coating in the form of a multilayer system applied on a transparent substrate, preferably made of soda-lime glass. In a particularly advantageous embodiment, it is taken into consideration that known dielectric beam splitters, with a given reflection, usually show an excessive transmission, so that parts located behind the mirror system are visible in an undesired manner, and that the rear-side reflection is undesirably high, so that in case of multiple reflection, scattered light might reduce the contrast. As opposed to this, metallic beam splitters, such as, for example, thin chromium layers do not achieve the desired high reflection for a given transmission and are, furthermore, relatively sensitive to scratching, whereas metallic layers with an additional reflector layer partly fulfill the optical requirements, but the absorption of such systems is still too high for a given reflection, and the mirrors are very sensitive to scratching, so that the use of large quantities with high operational reliability is out of the question.

In order to reliably fulfill the above-mentioned design criterion, while taking into account these aspects, the multilayer coating system provided for the semitransparent mirror is, in a particularly advantageous embodiment, made up of a combination of layers, chosen in a particularly well suited manner, made on the one hand of a high-refractive material, in particular with an index of refraction of minimally two, on the other hand of a low-refractive material, in particular with an index of refraction of maximally two, and of a metallic layer. Preferably, a double layer of the low-refractive material on the one hand and the metallic layer on the other hand are bordered on both sides, in the manner of a sandwich structure, by adjacent layers of the high-refractive material. The desired optical properties can be achieved in particular by arranging the layer of low-refractive in front of the metallic layer, viewed in the direction of incidence of the light.

The mirror can be executed as a so-called position-1 mirror, the coating being arranged in position 1, i.e. on the side of the viewer or the light-incidence side, and the substrate forming the rear side, or else as a so-called position-2 mirror, the substrate forming the front side and the coating being arranged in position 2 on the side facing away from the incidence of light and facing towards any indicating elements.

For an arrangement as a position-1 mirror, the substrate forming the rear side of the mirror and the coating being applied on the side of the viewer or the light-incidence side, a particularly advantageous embodiment provides the layer sequence substrate/H/M/L/H, H being a layer made of a high-refractive material with an index of refraction of minimally two, L being a layer made of low-refractive material with an index of refraction of maximally two, and M being a metallic layer. The two H layers of high-refractive material can be identical with each other or different from each other in their parameters, in particular regarding the material chosen, the thickness and the like. The index of refraction should be evaluated with a wavelength of 550 nm.

Particularly good optical properties can be achieved by designing the optical properties in particular for a so-called design wavelength of the rear-view mirror, which is adapted to a particularly high degree to the eye sensitivity curve. As a particularly well suited design wavelength, a wavelength of approximately 550 nm is chosen, corresponding to the maximum of the spectral eye sensitivity curve for photopic vision. To guarantee a particularly well suited adaptation of the layer system to this design wavelength, the layer thicknesses, in particular the so-called optical layer thickness, i.e. the product of actual layer thickness and index of refraction, of the dielectric layers are preferably chosen in a suitable manner.

Preferably, with a wavelength of 550 nm, the layer H adjacent to the substrate, has an optical layer thickness of 98 nm to 394 nm, preferably of maximally 344 nm, the layer L has an optical layer thickness of 58 to 203 nm, preferably of maximally 189 nm, the additional layer H has an optical layer thickness of 48 nm to 238 nm, preferably of 190 nm, and the layer M has a thickness of 2 nm to 7 nm.

In an alternative advantageous embodiment, the semitransparent mirror can be designed for use as a position-2 mirror, the substrate forming the front side and the multilayer coating being arranged on the side of the substrate facing away from the viewer or from the incidence of light. In such an embodiment, in a particularly advantageous version, a multilayer coating with the layer sequence substrate/H/L/M/H is applied on the substrate on the light-emergence side, H being a layer made of high-refractive material with an index of refraction of minimally two, L being a layer made of low-refractive material with an index of refraction of maximally two, and M being a metallic layer. The two H layers of high-refractive material can be identical with each other or different from each other in their parameters, in particular regarding the material chosen, the thickness and the like. To guarantee the above-mentioned particularly preferred adaptation to a design wavelength considered as suitable, this semitransparent mirror is designed, in a further advantageous embodiment, in such a way that, with a wavelength of 550 nm, the layer H adjacent to the substrate has an optical layer thickness of 49 nm to 344 nm, preferably of maximally 246 nm, the layer L has an optical layer thickness of 44 nm to 203 nm, preferably of maximally 174 nm, the additional layer H has an optical layer thickness of 95 nm to 167 nm, and the layer M has a thickness of 3 nm to 9 nm.

Favorable properties can be achieved for the two above-mentioned variants, if, in another advantageous embodiment, the index of refraction of the low-refractive material is at least 0.2 times, preferably at least 0.5 times, lower than the index of refraction of the high-refractive material.

Particularly high-quality mirror systems, well suited for use in the field of motor vehicles can be achieved, if in an advantageous embodiment the high-refractive material forming the H layers comprises titanium dioxide ($TiO_2$) and/or niobium oxide ($Nb_2O_5$), the low-refractive material forming the L layer comprises silicon dioxide ($SiO_2$) and/or the metal forming the M layer comprises nickel (Ni), chromium (Cr) and/or titanium (Ti).

Advantageously, the semitransparent mirror is used as a mirror in a motor vehicle, in particular as an inside mirror for a motor vehicle.

The advantages achieved with the invention consist in particular in that, due to the purposeful specification of the optical properties of the semitransparent mirror and in particular due to their implementation making use of the above-mentioned layer sequences, mirrors can be provided which even under everyday operating conditions have a particularly long lifetime and high reliability and are particularly well suited for use in combination with associated display or indicating elements. It is possible in particular through the above-mentioned combination of the optical properties, especially in the relatively sophisticated environment of inside mirrors for motor vehicles, to fulfill all requirements existing in this connection to a particularly high degree.

BRIEF DESCRIPTION OF THE DRAWINGS

Exemplary embodiments of the invention are explained in detail by means of a drawing, in which.

Identical parts are marked with the same reference numbers in both figures.

DETAILED DESCRIPTION

Figure 1:
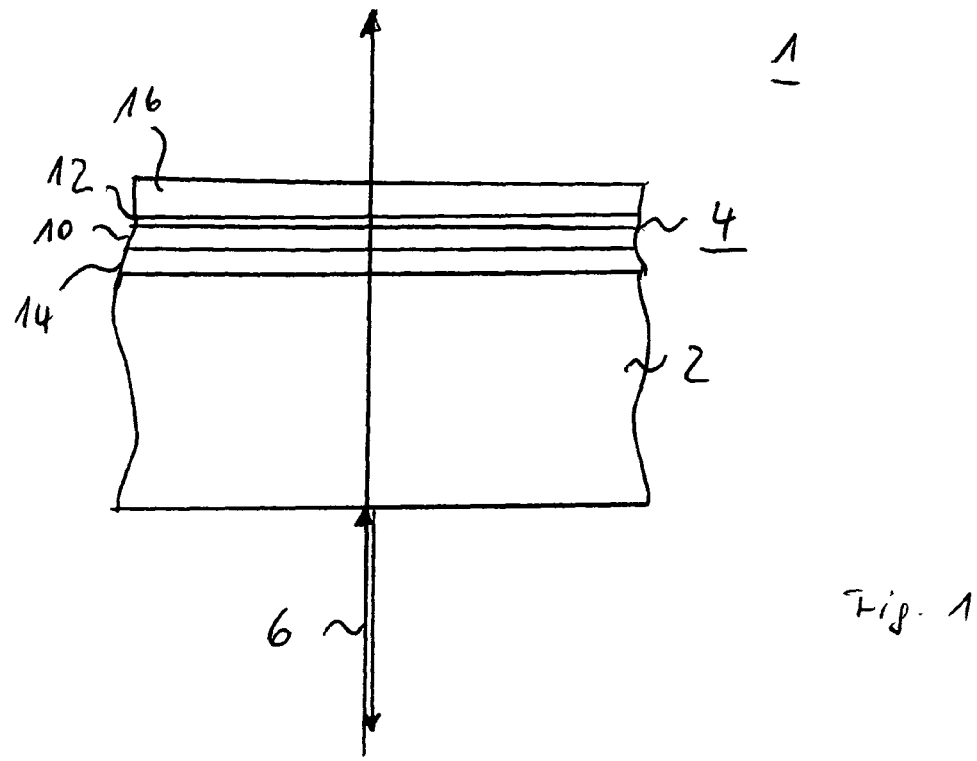
FIG. 1, 2: are each a schematic representation of a detail of a rear-view mirror for motor vehicles.
Figure 2:
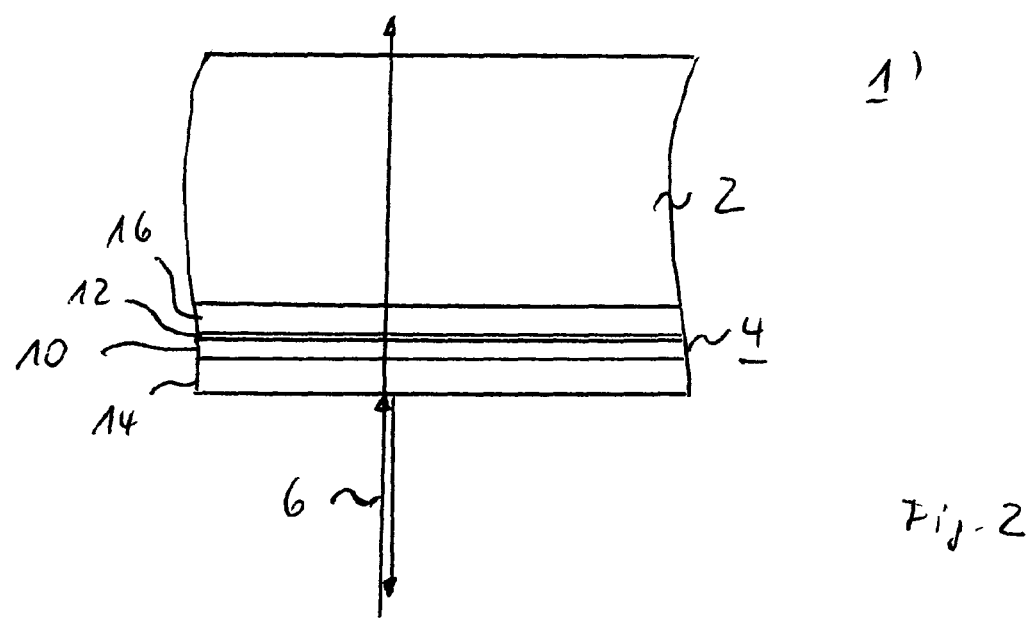

The rear-view mirror 1, 1', a detail of which is shown in cross-section in FIG. 1, 2, is provided as a semitransparent mirror for use in a motor vehicle. It comprises in each case a layer carrier or substrate 2, which in the exemplary embodiment is transparent and made of sodium silicate glass. To guarantee the reflective properties, a partially reflective multilayer coating system 4 is provided, the rearview mirror 1 according to FIG. 1 being provided for use in the so-called position two and the substrate 2 forming the front side, the coating 4 being arranged on the side of the substrate 2 which is facing away from the light-incidence side indicated by the arrow 6. As opposed to this, the rearview mirror 1' according to FIG. 2 is provided for use in the so-called position one, in which the substrate 2 forms the rear side and the coating 4 is arranged on the side of the substrate 2 which is facing towards the light-incidence side indicated by the arrow 6.

The rear-view mirror 1, 1' is designed to a particularly high degree for suitability for use as an inside mirror for a motor vehicle, which is to be combined with a subsequent display or indicating unit. For this purpose, the rearview mirror 1, 1' is designed as a semitransparent mirror, whose optical properties are specifically adapted to the corresponding requirements, namely an altogether high reflection and, nevertheless, a sufficiently high transmission for a sufficient illumination of the display as well as for a sufficiently low reflection on the rear side to avoid undesired scattered light. For this purpose, the mirror 1, 1' is designed for a luminous reflectance on the front side, under standard illuminant C, of minimally 60%, a luminous reflectance on the rear side, under standard illuminant C, of maximally 25%, and a light transmittance of minimally 20%.

To achieve these design targets, the multilayer coating system 4 is designed in each case as a suitable combination of a layer 10 made of a low-refractive material L with an index of refraction, with a wavelength of 550 nm, of less than two, and a layer 12 of a metallic material M adjacent thereto in light-transmission direction, the resulting double layer being bordered on both sides, in the manner of a sandwich structure, by a layer 14, respectively 16, of a high-refractive material H with an index of refraction, with a wavelength of 550 nm, of more than two. The high-refractive material H forming the layers 14, 16 preferably comprises the materials $TiO_2$ and/or $Nb_2O_5$. The low-refractive material L forming the layer 10 preferably comprises $SiO_2$. The metal M forming the layer 12 preferably comprises Ni, Cr and/or Ti.

In the following Table 1, semitransparent mirror systems according to the present invention are listed in detail in view of characteristic optical data, the examples marked * just being comparative examples.

| Example number | Use | Layers on the glass, starting with (1) to (4) | | | | Reflection Front side | | | Rear side R(C) | Transmission | | |
|---|---|---|---|---|---|---|---|---|---|---|---|---|
| | | ds(1) [nm] | ds(2) [nm] | ds(3) [nm] | ds(4) [nm] | R(C) | a* (C, 2°) | b* (C, 2°) | | T(C) | a* (C, 2°) | b* (C, 2°) |
| | | $TiO_2$ | Cr | $SiO_2$ | $Nb_2O_5$ | | | | | | | |
| 1* | position 1 | 35 | 2 | 60 | 70 | 58.6% | −7.5 | −3.7 | 16.9% | 30.6% | 8.4 | −0.3 |
| 2 | position 1 | 40 | 2 | 60 | 70 | 61.6% | −7.7 | −2.5 | 20.4% | 29.2% | 9.2 | −0.8 |
| 3* | position 1 | 40 | 1 | 60 | 70 | 58.2% | −8.5 | −4.2 | 32.8% | 35.8% | 9.4 | 2.8 |
| 4 | position 1 | 40 | 2 | 90 | 50 | 65.9% | −6.3 | −4.6 | 22.8% | 25.8% | 8.4 | 3.4 |
| 5 | position 1 | 40 | 4 | 120 | 30 | 64.2% | −7.0 | 0.1 | 8.6% | 22.4% | 8.9 | −6.1 |
| 6 | position 1 | 40 | 5 | 40 | 80 | 62.6% | −8.3 | 1.3 | 6.4% | 21.7% | 10.0 | −8.4 |
| 7 | position 1 | 50 | 3 | 70 | 60 | 70.4% | −6.4 | −2.0 | 19.4% | 21.4% | 9.2 | 1.4 |
| 8* | position 1 | 50 | 4 | 35 | 70 | 58.9% | −9.2 | −9.2 | 14.5% | 27.4% | 8.8 | 9.6 |
| 9 | position 1 | 50 | 4 | 40 | 70 | 62.5% | −8.4 | −6.6 | 14.3% | 25.0% | 9.0 | 6.8 |
| 10 | position 1 | 50 | 4 | 130 | 20 | 60.4% | −9.0 | 3.4 | 10.4% | 26.3% | 9.3 | −5.9 |
| 11* | position 1 | 50 | 4 | 130 | 18 | 58.6% | −9.0 | 1.4 | 10.2% | 27.5% | 8.8 | −3.8 |
| 12 | position 1 | 50 | 4 | 140 | 20 | 60.0% | −10.7 | 12.8 | 10.1% | 26.5% | 11.2 | −14.7 |
| 13* | position 1 | 50 | 4 | 150 | 20 | 58.3% | −13.0 | 26.2 | 9.6% | 27.8% | 13.1 | −23.4 |
| 14 | position 1 | 50 | 6 | 40 | 100 | 61.0% | −9.2 | 34.3 | 6.3% | 22.5% | 9.9 | −28.2 |
| 15* | position 1 | 50 | 6 | 40 | 110 | 51.2% | 7.8 | 20.0 | 5.4% | 28.3% | −7.4 | −16.3 |
| 16 | position 1 | 50 | 6 | 130 | 20 | 64.8% | −8.0 | 3.9 | 6.6% | 20.1% | 8.9 | −6.6 |
| 17 | position 1 | 50 | 7 | 60 | 100 | 61.5% | 2.5 | 22.3 | 5.5% | 20.7% | −3.1 | −20.7 |
| 18* | position 1 | 50 | 8 | 60 | 100 | 63.2% | 2.5 | 21.3 | 5.9% | 18.5% | −3.2 | −20.0 |
| 19 | position 1 | 50 | 7 | 100 | 20 | 61.1% | −7.2 | −10.5 | 8.4% | 20.7% | 6.6 | 12.3 |
| 20 | position 1 | 60 | 6 | 110 | 20 | 63.8% | −7.3 | −3.3 | 12.6% | 20.5% | 8.2 | 7.2 |
| 21 | position 1 | 90 | 4 | 110 | 30 | 60.5% | −4.8 | 9.0 | 18.1% | 20.3% | 9.5 | −8.7 |
| 22 | position 1 | 140 | 4 | 100 | 40 | 63.0% | −9.2 | −6.8 | 7.3% | 20.1% | 6.3 | 1.4 |
| 23 | position 1 | 160 | 6 | 140 | 20 | 61.8% | −19.4 | 24.5 | 7.1% | 20.2% | 9.6 | −12.8 |
| 24* | position 1 | 170 | 6 | 140 | 20 | 62.8% | −16.8 | 29.2 | 9.0% | 19.8% | 11.9 | −13.8 |
| | | $TiO_2$ | $SiO_2$ | Cr | $Nb_2O_5$ | | | | | | | |
| 25* | position 2 | 17 | 100 | 5 | 60 | 59.3% | −6.1 | −3.1 | 15.0% | 27.2% | 4.8 | 10.4 |
| 26 | position 2 | 20 | 100 | 5 | 60 | 61.5% | −6.3 | −2.6 | 15.5% | 25.6% | 5.5 | 9.9 |
| 27 | position 2 | 20 | 110 | 5 | 70 | 60.8% | −6.6 | 8.2 | 21.8% | 22.9% | 7.6 | 2.4 |
| 28* | position 2 | 30 | 100 | 2 | 50 | 59.2% | −7.6 | −7.2 | 29.6% | 32.7% | 6.9 | 8.4 |
| 29 | position 2 | 30 | 100 | 3 | 50 | 61.1% | −7.3 | −6.6 | 20.9% | 28.9% | 6.3 | 7.5 |
| 30 | position 2 | 30 | 120 | 6 | 50 | 66.6% | −8.0 | 5.3 | 7.0% | 20.4% | 7.6 | −8.8 |
| 31 | position 2 | 30 | 130 | 6 | 50 | 65.0% | −10.1 | 14.5 | 6.9% | 21.5% | 10.0 | −17.9 |
| 32 | position 2 | 30 | 140 | 6 | 50 | 62.1% | −12.3 | 26.9 | 6.6% | 23.5% | 11.5 | −25.9 |
| 33* | position 2 | 30 | 150 | 6 | 50 | 57.8% | −11.2 | 37.2 | 6.3% | 26.4% | 8.9 | −28.9 |
| 34 | position 2 | 40 | 100 | 4 | 60 | 69.8% | −7.4 | 4.9 | 21.7% | 20.9% | 8.7 | −2.2 |
| 35* | position 2 | 60 | 60 | 6 | 35 | 56.8% | −6.6 | −9.5 | 3.2% | 20.5% | 5.7 | 0.1 |
| 36 | position 2 | 60 | 60 | 6 | 40 | 60.7% | −6.8 | −9.1 | 2.5% | 20.7% | 5.5 | 3.0 |
| 37 | position 2 | 70 | 60 | 4 | 50 | 64.6% | −8.4 | −0.4 | 14.6% | 24.5% | 8.3 | −1.9 |
| 38* | position 2 | 80 | 25 | 7 | 60 | 59.1% | −10.5 | 2.5 | 14.6% | 24.1% | 8.9 | 6.5 |
| 39 | position 2 | 80 | 30 | 7 | 60 | 61.8% | −9.9 | 4.3 | 14.6% | 22.3% | 8.8 | 4.2 |
| 40 | position 2 | 80 | 30 | 9 | 50 | 61.6% | −9.3 | −0.9 | 3.4% | 20.1% | 6.4 | 1.0 |
| 41* | position 2 | 80 | 30 | 10 | 50 | 63.3% | −8.9 | −0.3 | 3.6% | 18.1% | 6.2 | 1.3 |
| 42 | position 2 | 90 | 40 | 6 | 70 | 60.9% | −7.7 | 21.2 | 23.9% | 20.8% | 7.2 | −6.2 |

-continued

| Example number | Use | Layers on the glass, starting with (1) to (4) | | | | Reflection Front side | | | Rear side R(C) | Transmission | | |
|---|---|---|---|---|---|---|---|---|---|---|---|---|
| | | ds(1) [nm] | ds(2) [nm] | ds(3) [nm] | ds(4) [nm] | R(C) | a* (C, 2°) | b* (C, 2°) | | T(C) | a* (C, 2°) | b* (C, 2°) |
| 43* | position 2 | 90 | 40 | 6 | 75 | 59.1% | −6.8 | 24.6 | 28.3% | 19.5% | 7.8 | −7.3 |
| 44 | position 2 | 90 | 80 | 6 | 50 | 62.5% | 0.5 | 7.0 | 6.4% | 23.3% | −4.1 | −9.9 |
| 45 | position 2 | 100 | 50 | 7 | 60 | 60.2% | 2.0 | 6.8 | 11.0% | 23.1% | −5.1 | 1.2 |
| 47* | position 2 | 150 | 70 | 9 | 50 | 65.6% | −16.1 | −6.4 | 3.5% | 17.7% | 15.5 | 9.7 |

The parameters shown specify the actual thicknesses of the individual layers together with the material used in each case. The optical layer thickness can be determined therefrom for the materials mentioned through multiplication by the respective index of refraction with a wavelength of 550 nm, i.e. for $TiO_2$, by 2.46, for $Nb_2O_5$, by 2.38, and for $SiO_2$, by 1.45. Furthermore, the reflectances with standard illuminant C on the front side of the mirror and on its rear side as well as the transmittance with standard illuminant C are indicated. In view of important quantities of illuminating engineering, reference is made in this connection to the following standards:

DIN 5031-3 (March 1982) Table of eye sensitivity curve $V(\lambda)$ (photopic vision)

DIN 5033-2 (May 1992) Colorimetric normal viewer 2° CIE 1931 and 2°—standard colorimetric system DIN 5033-3 (July 1992) L*a*b* color space CIE 1976

DIN 5033-7 (July 1983) Table of relative spectral energy distribution $S(\lambda)$ of standard illuminant C DIN 5036-1 (July 1978)

Luminous reflectance $$\rho = \frac{\Phi_\rho}{\Phi} = \frac{\int_0^\infty \Phi_{e\lambda} \cdot \rho(\lambda) \cdot V(\lambda) \cdot d\lambda}{\int_0^\infty \Phi_{e\lambda} \cdot V(\lambda) \cdot d\lambda}$$

$\rho(\lambda)$ spectral reflectance

If standard illuminant C is used, the wavelength-dependent luminous flux $\Phi_{e\lambda}$ can be replaced by $S(\lambda)$.

Ditto, light transmittance $$\tau = \frac{\Phi_\tau}{\Phi} = \frac{\int_0^\infty \Phi_{e\lambda} \cdot \tau(\lambda) \cdot V(\lambda) \cdot d\lambda}{\int_0^\infty \Phi_{e\lambda} \cdot V(\lambda) \cdot d\lambda}$$

LIST OF REFERENCE NUMBERS 1, 1' Semitransparent mirror
2 Substrate
4 Coating system
6 Arrow
10 Layer
12 Layer
14, 16 Layer
L Low-refractive material
M Metallic material
H High-refractive material

The invention claimed is:

1. A semitransparent mirror comprising:
a front side having a front luminous reflectance of at least 60% at a vertical light incidence under standard illuminant C;
a rear side having a rear luminous reflectance of at most 25% at the vertical light incidence; and
a light transmittance of at least 20% at the vertical light incidence.

2. The semitransparent mirror as recited in claim 1, wherein the front luminous reflectance is at least 65%.

3. The semitransparent mirror as recited in claim 1, wherein the rear luminous reflectance is at most 20%.

4. The semitransparent mirror as recited in claim 1, wherein the light transmittance is at least 25%.

5. The semitransparent mirror as recited in claim 1, wherein a reflection on the front side and a transmission of the vertical light incidence under standard illuminant C and a view angle of 2° each include a color value a* and a color value b* having an absolute amount of at most 10.

6. The semitransparent mirror as recited in claim 1, further comprising a transparent substrate and a multilayer coating disposed on a rear side of the transparent substrate, the coating having a layer sequence of a first H layer, an L layer, an M layer and a second H layer, wherein the first and the second H layers include a high-refractive material having an index of refraction of at least 2, the L layer includes a low-refractive material having an index of refraction of at most 2, and the M layer includes a metallic layer.

7. The semitransparent mirror as recited in claim 6, wherein the index of refraction of the low refractive material is at most 0.2 times the index of refraction of the high-refractive material.

8. The semitransparent mirror as recited in claim 7, wherein the index of refraction of the low refractive material is at most 0.5 times the index of refraction of the high-refractive material.

9. The semitransparent mirror as recited in claim 6, wherein, at a wavelength of 550 nm, the first H layer has an optical layer thickness of between 49 nm and 344 nm, the L layer has an optical layer thickness of between 44 nm and 203 nm, the second H layer has an optical thickness of between 95 nm and 167 nm, and the M layer has an optical thickness of between 3 nm and 9 nm.

10. The semitransparent mirror as recited in claim 6, wherein the high-refractive material includes at least one of $TiO_2$ and $Nb_2O_5$.

11. The semitransparent mirror as recited in claim 6, wherein the low-refractive material includes $SiO_2$.

12. The semitransparent mirror as recited in claim 6, wherein the metallic layer includes at least one of Ni, Cr and Ti.

13. The semitransparent mirror as recited in claim 1, further comprising a transparent substrate and a multilayer coating disposed on a front side of the transparent substrate, the coating having a layer sequence of a first H layer adjacent to the substrate, an L layer, an M layer and a second H layer, wherein the first and the second H layers include a high-refractive material having an index of refraction of at least 2, the L layer includes a low-refractive material having an index of refraction of at most 2, and the M layer includes a metallic layer.

14. The semitransparent mirror as recited in claim 13, wherein the index of refraction of the low refractive material is at most 0.2 times the index of refraction of the high-refractive material.

15. The semitransparent mirror as recited in claim 14, wherein the index of refraction of the low refractive material is at most 0.5 times the index of refraction of the high-refractive material.

16. The semitransparent mirror as recited in claim 13, wherein, at a wavelength of 550 nm, the first H layer has an optical layer thickness of between 49 nm and 344 nm, the L layer has an optical layer thickness of between 44 nm and 203 nm, the second H layer has an optical thickness of between 95 nm and 167 nm, and the M layer has an optical thickness of between 3 nm and 9 nm.

17. The semitransparent mirror as recited in claim 13, wherein the high-refractive material includes at least one of $TiO_2$ and $Nb_2O_5$.

18. The semitransparent mirror as recited in claim 13, wherein the low-refractive material includes $SiO_2$.

19. The semitransparent mirror as recited in claim 13, wherein the metallic layer includes at least one of Ni, Cr and Ti.

* * * * *